United States Patent [19]
Shofner

[11] 3,796,885
[45] Mar. 12, 1974

[54] APPARATUS FOR TREATING A MOVING SURFACE WITH A SPARK DISCHARGE

[75] Inventor: Don L. Shofner, Bartlesville, Okla.

[73] Assignee: Phillips Petroleum Company, Bartlesville, Okla.

[22] Filed: Feb. 10, 1972

[21] Appl. No.: 225,042

[52] U.S. Cl............... 250/492, 250/325, 317/262 A
[51] Int. Cl...................... H01j 37/00, G01n 23/00
[58] Field of Search..... 204/323, 325; 250/49.5 GC, 250/49.5 TC, 49.5 TE; 317/262 R, 262 A

[56] References Cited
UNITED STATES PATENTS

| | | | |
|---|---|---|---|
| 3,017,339 | 1/1962 | Dewey | 250/49.5 X |
| 3,428,801 | 2/1969 | Leach et al. | 250/49.5 |
| 2,935,418 | 5/1960 | Berthold et al. | 204/168 |
| 3,600,122 | 8/1971 | Coleman | 204/168 X |
| 3,376,028 | 4/1968 | Wood | 204/168 |

*Primary Examiner*—William F. Lindquist

[57] ABSTRACT

The surface of an elongated article, particularly one of substantially circular cross section such as a rod or tube, is treated with a spark discharge by employing an apparatus comprising a stationary encircling electrode and a revolving electrode. The elongated article advances through the encircling electrode while the revolving electrode is caused to revolve about it at a rate sufficiently fast to insure the entire surface of the tube or rod is treated with the spark that discharges between the two electrodes.

4 Claims, 1 Drawing Figure

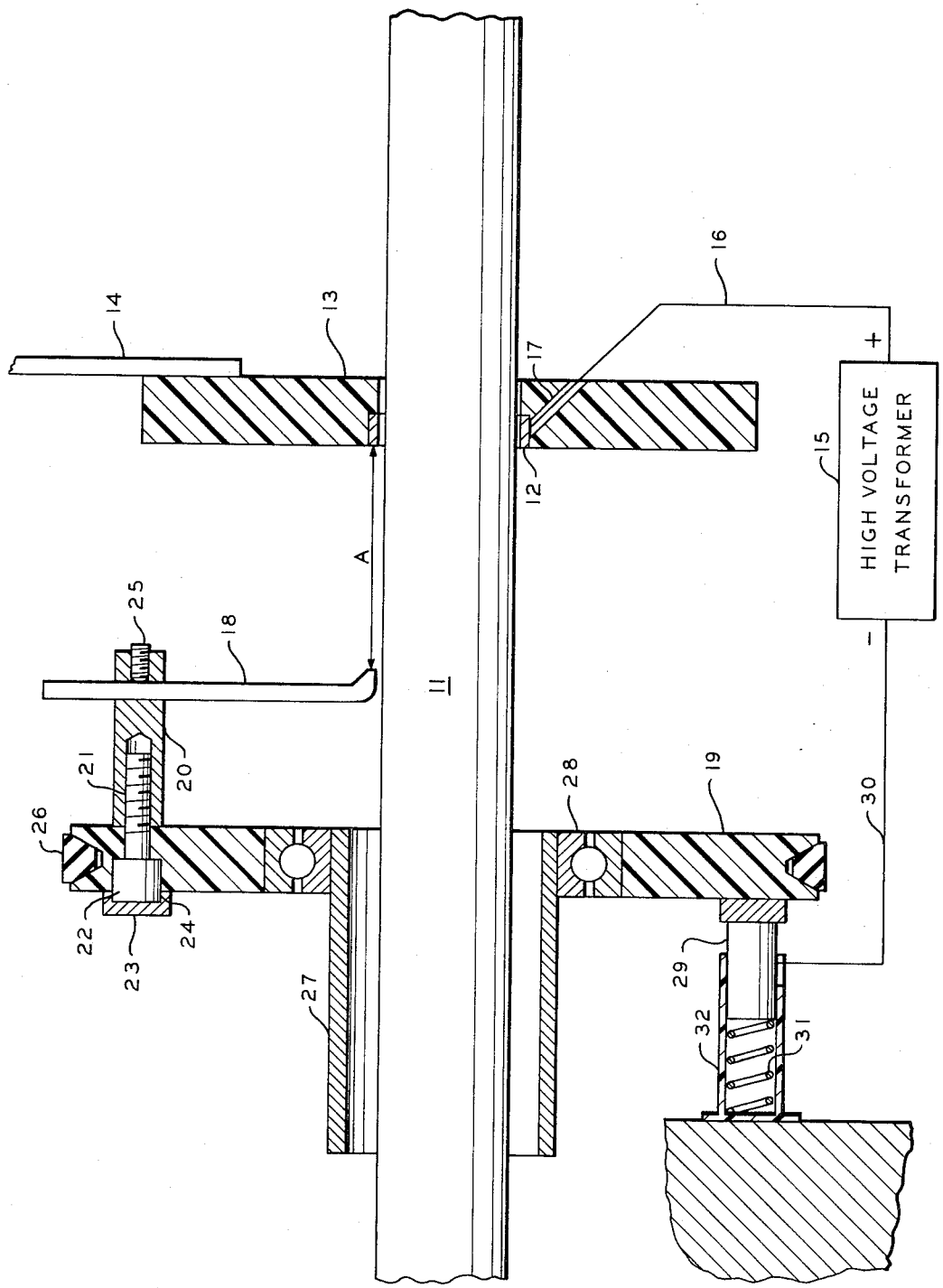

APPARATUS FOR TREATING A MOVING SURFACE WITH A SPARK DISCHARGE

BACKGROUND OF THE INVENTION

This invention relates to the treatment of the surface of a moving article by means of a spark discharge.

Tubing, particularly plastic tubing, is widely used in a modern industrial society. In many of those applications it is frequently desired or even necessary to decorate the tube or provide a protective coating for it by painting, printing or adhering a label. However, in the case of plastic tubing, it is particularly difficult to cause paint, ink or adhesive to bond tenaciously to the surface.

One method for improving the bonding of other materials to plastic is to contact the surface with a high voltage spark discharge. The spark discharge oxidizes the plastic surface creating polar sites that better interact with inks, paints, adhesives and the like.

In the case of plastic tubing, the spark discharge treatment can be conveniently carried out as the tubing is being extruded. This is normally done by passing the tubing through ring electrodes such as are shown in U.S. Pat. No. 3,017,339. The prior art has the disadvantage that increasing the extrusion rate reduces the exposure time of the plastic tubing to the spark discharge. This renders the treatment less effective.

SUMMARY OF THE INVENTION

It is an object of this invention to provide a novel method and apparatus for the uniform treatment of a moving surface with a spark discharge.

It is yet another object of this invention to render the exterior surface of an elongated plastic article more receptive to protective and decorative coatings, inks, labels and the like.

In accordance with the invention, the surface of a moving article is subjected to a spark discharge in a uniform manner regardless of speed of movement of the surface with a spark discharge that moves transversely to the direction of movement of the plastic surface being treated.

More specifically, articles such as tubular and rod-like elements are moved axially while being subjected to a spark discharge which moves transversely to the direction of movement of the plastic article at a rate correlated with the axial movement so as to subject the entire plastic surface to a uniform exposure of spark discharge.

Further in accordance with the invention, the rate of movement of a revolving point electrode moving transversely to the axial movement of a plastic article is correlated with the axial movement so that regardless of the speed of axial movement of the plastic surface the plastic surface is subjected to a uniform exposure to a spark discharge.

In specific embodiments, plastic elements such as plastic pipe or rod-like elements are treated on the exterior surface by a spark discharge by means of a circumferentially rotating electrode spaced from an encircling stationary electrode at a rate such that the entire exterior surface of a moving plastic element is subjected to a uniform treatment with a spark discharge.

This novel process and apparatus allows an operator to vary the extrusion rate for making a plastic rod or tube without sacrificing the period of exposure to the spark discharge. As the rate of extrusion is increased, the rate of revolution of the point electrode can be increased to compensate and provide equivalent exposure time to the spark discharge.

BRIEF DESCRIPTION OF THE DRAWING

FIG. 1 is a cross-sectional view of an embodiment of the apparatus of this invention.

DESCRIPTION OF THE PREFERRED EMBODIMENTS

In a presently preferred embodiment, the process of this invention involves advancing an elongated article, preferably one of substantially circular cross-section such as a rod or tube, in relation to a pair of electrodes so as to treat the exterior surface with a spark discharge. Hereinafter the invention will be described as applicable for use with tubing. It will be understood that other elongated articles such as rods can be treated the same way.

One electrode is a stationary encircling electrode, normally in the shape of a ring and having an inside diameter such that the tube to be treated can pass through it. The tube should be advanced through the ring electrode along a line so that the center of the tube is substantially coincident with the center of the ring electrode. The inside diameter of the ring electrode may be varied relative to the outside diameter of the tube to be treated. In this way the distance between the tube and electrode can be regulated and thus offer one means for varying the intensity of the spark discharge to which the tube is subjected.

The second electrode is a point electrode that is disposed so as to revolve about the tube as it is advanced. This revolving electrode is preferably connected to a variable speed drive so that its rate of revolution can be conveniently controlled. Preferably the gap between the revolving electrode and stationary electrode is variable.

The rate of revolution of the point electrode will normally be such that it completes at least one full revolution before the tube has advanced a distance greater than the gap between the two electrodes. It is readily seen that this rate is the minimum required to insure that the entire exterior surface of the tube is subjected to the spark discharge. Furthermore, it can be seen that the effective exposure to the spark discharge can be increased by increasing the rate of revolution of the revolving electrode relative to the rate of advance of the tube. It is also apparent that the rate of extrusion can be increased without decreasing exposure to the discharge merely by increasing the rate of revolution of the point electrode a compensating amount.

From the foregoing discussion it will be readily apparent that the novel process and apparatus of this invention will allow greater flexibility for treating a tubing surface with a spark discharge than would be possible if two stationary electrodes are employed.

Although the apparatus of this invention can be used to treat tube or rod like elements of many types, generally the process and apparatus will be employed to treat the surface of plastic tubing extruded from thermoplastic materials such as polyamides, polyesters and polyolefins, particularly polyethylene, polypropylene, and polyvinylchloride. Normally the apparatus will be employed in combination with an extruder for making the plastic tubing. However, this need not be the case and the apparatus may be employed alone for the purpose of treating prefabricated plastic pipe with a spark discharge.

Referring now to FIG. 1, which represents a presently preferred embodiment of the apparatus of this invention, a continuous length of plastic pipe 11 is shown advancing in the direction of the arrow. Although not shown, preferably the pipe is being withdrawn from a suitable extruding apparatus at substantially a constant rate. In the course of travel it passes through stationary ring electrode 12 which is inserted in and carried by stationary ring 13. The ring electrode 12 is constructed of a suitable conducting material such as brass. The stationary member 13, however, is constructed of a nonconducting material. Stationary member 13 is detachably affixed to frame number 14.

The inside diameter of ring electrode 12 can be varied according to the outside diameter of the pipe to be treated. The operator need only select a stationary member 13 having a ring electrode of the appropriate diameter and attach it to frame member 14 prior to advancing the pipe to be treated.

Ring electrode 12 is connected to one pole (usually the positive pole) of a high voltage source 15, by means of wire lead 16. Voltage source 15 should be capable of generating a voltage sufficient to cause a spark discharge in air across an electrode gap varying from 1/16 to 1.5 in. A voltage from 220–15000 volts is sufficient for this purpose. Wire lead 16 is shown connected with ring electrode 12 through conduit 17 in the stationary member. Of course, other configurations can be employed.

The second electrode, usually the discharge electrode, is a point electrode disposed so as to be capable of being revolved about the advancing pipe. The revolving electrode can have an elongated cylindrical shape as shown in FIG. 1 by the numeral 18. The discharge end of this electrode is desirably bent as shown so as to insure the discharge occurs at the point desired. In order to revolve about the pipe, revolving electrode 18 is shown affixed to wheel 19 which is constructed of a nonconducting material. As shown in FIG. 1, the revolving electrode is affixed to wheel 19 by means of connector arm 20 which has embedded therein a pin member 21.

Pin member 21 engages cylindrical sleeve 22 which extends through wheel 19. Cylindrical sleeve 22 is of sufficient length to extend beyond the face of wheel 19 opposite the face wherein insertion of the pin 21 is made. The extended portion of the sleeve contacts a slip ring 23 in recess 24 provided for that purpose. Slip ring 23 is fixedly attached to wheel 19.

Revolving electrode 18 preferably engages connector arm 20 through an opening extending through the connector arm. This electrode is held in this opening by means of set screw 25 and this allows the revolving electrode to be raised or lowered as the diameter of ring electrode 12 is changed. Revolving electrode 18, connector arm 20, pin 21, cylindrical sleeve 22 and slip ring 23 are all constructed of an electrically conducting material.

Wheel 19 is shown as driven by a V-belt 26. The V-belt can be attached to a variable drive motor not shown. When driven, wheel 19 turns about frame number 27 (not shown in complete detail) on bearing 28. The opening in frame number 27 should be large enough to allow passage therethrough of the largest diameter pipe it is contemplated will be treated using the apparatus of this invention.

As wheel 19 rotates, slip ring 23 picks up current from brush member 29 which is itself connected to high voltage source 15 by means of wire lead 30. Normally this connection is to the negative pole of the high voltage source which makes revolving electrode 18 the discharge electrode. Brush member 29 is held in firm contact with slip ring 23 by means of spring 31 in housing 32 or other suitable arrangement. Of course, the tension on spring 31 will not be so great so as to create excessive friction between brush member 29 and slip ring 23. However, any wear of brush member 29 or slip ring 23 caused by the friction generated as wheel 19 rotates will be compensated for by expansion of spring 31.

The gap A between ring electrode 12 and revolving electrode 18 can be varied by employing different length connector arms. As shown in FIG. 1, a longer connector arm 20 would decrease the electrode gap while a shorter arm would increase the gap. Of course, any other suitable arrangement for adjusting the gap between the two electrodes is within the scope of this invention.

By varying the speed of the variable drive, wheel 19 can be caused to carry revolving electrode 18 at a rate of revolution selected by the operator. Thus, in a preferred embodiment where plastic pipe 11 is being continuously extruded, rate of revolution of electrode 18 can be varied as the rate of extrusion is varied. Of course, the rate of advancing the tube that is to be treated with the discharge, whether by extrusion or other means, should be substantially constant.

As will be appreciated by one skilled in the art, all electrical circuitry should be appropriately insulated to insure the safety of the operator.

I claim:

1. An apparatus for treating the surface of an elongated article with a spark discharge comprising in combination:
    1. a first electrode, said first electrode being in the shape of a ring and having an inside diameter greater than the outside diameter of the elongated article;
    2. a second electrode, which is a point electrode spaced apart from the first electrode and disposed so as to be capable of revolving about the elongated article;
    3. means for driving the revolving electrode at variable speed;
    4. means for advancing the elongated article at a substantially constant speed through the ring electrode along a line such that the center of the elongated article is substantially coincident with the center of the ring electrode; and
    5. means for creating a potential difference between the two electrodes sufficient to create a spark discharge.

2. An apparatus according to claim 1 wherein the variable speed means for driving the revolving electrode is a wheel having a variable speed drive.

3. An apparatus according to claim 1 wherein the gap between the ring electrode and the revolving electrode is adjustable.

4. An apparatus according to claim 1 wherein the revolving electrode is a discharge electrode.

* * * * *